(12) United States Patent
Wallin et al.

(10) Patent No.: US 7,237,068 B2
(45) Date of Patent: Jun. 26, 2007

(54) COMPUTER SYSTEM EMPLOYING BUNDLED PREFETCHING AND NULL-DATA PACKET TRANSMISSION

(75) Inventors: Dan G. Wallin, Uppsala (SE); Erik E. Hagersten, Uppsala (SE)

(73) Assignee: Sun Microsystems, Inc., Santa Clara, CA (US)

( * ) Notice: Subject to any disclaimer, the term of this patent is extended or adjusted under 35 U.S.C. 154(b) by 364 days.

(21) Appl. No.: 10/766,698

(22) Filed: Jan. 28, 2004

(65) Prior Publication Data

US 2004/0260883 A1 Dec. 23, 2004

Related U.S. Application Data

(60) Provisional application No. 60/443,046, filed on Jan. 28, 2003.

(51) Int. Cl.
*G06F 12/00* (2006.01)
(52) U.S. Cl. ...................... 711/137; 712/207
(58) Field of Classification Search .............. 711/137
See application file for complete search history.

(56) References Cited

U.S. PATENT DOCUMENTS

| | | | |
|---|---|---|---|
| 5,881,303 A * | 3/1999 | Hagersten et al. ............ 712/30 |
| 6,138,213 A * | 10/2000 | McMinn ...................... 711/137 |
| 6,606,688 B1 * | 8/2003 | Koyanagi et al. ........... 711/137 |
| 6,643,766 B1 * | 11/2003 | Lesartre et al. ............. 712/207 |
| 2003/0115422 A1 * | 6/2003 | Spencer et al. ............. 711/137 |
| 2004/0039878 A1 * | 2/2004 | van de Waerdt ............ 711/137 |

OTHER PUBLICATIONS

Anant Agarwal, John Hennessy, and Mark Horowitz; Cache Performance of Operating System and Multiprogramming Workloads; Transactions on Computer Systems (TOCS); 1988; vol. 6, No. 4; pp. 393-431.

(Continued)

*Primary Examiner*—Brian R. Peugh
*Assistant Examiner*—Matthew Bradley
(74) *Attorney, Agent, or Firm*—Meyertons Hood Kivlin Kowert & Goetzel, P.C.; B. Noël Kivlin

(57) ABSTRACT

Various embodiments of a computer system employing bundled prefetching are disclosed. In one embodiment, a cache memory subsystem implements a method for prefetching data. The method comprises the cache memory subsystem receiving a read request to access a line of data and determining that a cache miss with respect to the line occurred. The method further comprises transmitting a bundled transaction on a system interconnect in response to the cache miss, wherein the bundled transaction combines a request for the line of data and a prefetch request. In response to the bundled transaction, the method further comprises determining that a second cache is an owner of the first line of data, determining whether the second cache is also an owner for any of the selected lines of data beyond the first line, the second cache transmitting to the first cache any of the selected lines for which the second cache is an owner, and the second cache transmitting a null-data packet to the first cache for each of a remainder of the selected lines of data for which the second cache is not an owner.

6 Claims, 6 Drawing Sheets

OTHER PUBLICATIONS

Alan Charlesworth; The Sun Fireplane System Interconnect; 2001 Conference on Supercomputing; 2001; 14 pages; Denver CO, U.S.A.

Tien-Fu Chen and Jean-Loup Baer; A Performance Study of Software and Hardware Data Prefetching Schemes; International Symposium on Computer Architecture; 1994; pp. 223-232.

Fredrik Dahlgren, Michel Dubois and Per Stenstrom; Sequential Hardware Prefetching in Shared-Memory Multiprocessors; IEEE Transactions on Parallel and Distributed Systems; 1995; vol. 6 No. 7; pp. 733-746.

Fredrik Dahlgren and Per Stenstrom; Evaluation of Hardware-Based Stride and Sequential Prefetching in Shared-Memory Multiprocessors; IEEE Transactions on Parallel and Distributed Systems; 1996; vol. 7, No. 4; pp. 385-398.

Michel Dubois, Jonas Skeppstedt, Livio Ricciulli, Krishnan Ramamurthy, and Per Stenstrom; The Detection and Elimination of Useless Misses in Multiprocessors; International Symposium on Computer Architecture; 1993; pp. 88-97.

Susan J. Eggers and Tor E. Jeremiassen; Eliminating False Sharing. 1991 International Conference on Parallel Processing; 1991; pp. 377-381.

Susan J. Eggers and Randy H. Katz; The Effect of Sharing on the Cache and Bus Performance of Parallel Programs. International Conference on Architec-tural Support for Programming Languages and Operating Systems; 1989; pp. 257-270.

Fredrik Dahlgren and Per Stenstrom; Performance Evaluation and Cost Analysis of Cache Protocol Extensions for Shared-Memory Multiprocessors; IEEE Transactions on Computers; 1998; vol. 47, No. 10; pp. 1041-1055.

M. J. Garzaran, J. L. Briz, P. E. Ibanez, and V. Vinals; Hardware Prefetching in Bus-Based Multiprocessors: Pattern Characterization and Cost-Effective Hardware; Parallel and Distributed Processing; 2001, pp. 345-354.

James R. Goodman; Using Cache Memory to Reduce Processor-Memory Traffic; In 25 Years of the International Symposia on Computer Architecture (selected papers); 1998; pp. 255-262.

Anoop Gupta and Wolf-Dietrich Weber; Cache Invalidation Patterns in Shared-Memory Multiprocessors. IEEE Transactions on Computers; 1992; vol. 41, No. 7; pp. 794-810.

Martin Karlsson, Kevin Moore, Erik Hagersten, and David A. Wood; Memory System Behavior of Java-Based Middleware; Ninth Annual International Symposium on High-Performance Computer Architecture (HPCA-9); 2003; 12 pages.

David M. Koppelman; Neighborhood Prefetching on Multiprocessors Using Instruction History; International Conference on Parallel Architectures and Compilation Techniques; 2000; pp. 123-132.

Sanjeev Kumar and Christopher Wilkerson; Exploiting Spatial Locality in Data Caches using Spatial Footprints; International Symposium on Computer Architecture; 1998; pp. 357-368.

Peter S. Magnusson, Magnus Christensson, Jesper Eskilson, Daniel Forsgren, Gustav Hallberg, Johan Hogberg, Fredrik Larsson, Andreas Moestedt, and Bengt Werner; Simics: A Full System Simulation Platform; IEEE Computer, 2002; vol. 35 No. 2; pp. 50-58.

Todd Mowry and Anoop Gupta; Tolerating Latency Through Software-Controlled Prefetching in Shared-Memory Multiprocessors; Journal of Parallel and Distributed Computing; 1991; vol. 12, No. 2; pp. 87-106.

Todd C. Mowry; Tolerating Latency in Multiprocessors through Compiler-Inserted Prefetching. Transactions on Computer Systems (TOCS); 1998; vol. 16, No. 1; pp. 55-92.

Steven Przybylski; The Performance Impact of Block Sizes and Fetch Strategies; International Symposium on Computer Architecture; 1990; pp. 160-169.

Andre Seznec; Decoupled Sectored Caches: conciliating low tag implementation cost and low miss ratio; 21st Annual International Symposium on Computer Architecture; 1994; pp. 384-393.

Josep Torrellas, Monica S. Lam, and John L. Hennessy; False Sharing and Spatial Locality in Multiprocessor Caches; IEEE Transactions on Computers; 1994; vol. 43, No. 6; pp. 651-663.

Dean M. Tullsen and Susan J. Eggers; Effective Cache Prefetching on Bus-Based Multiprocessors; Transactions on Computer Systems (TOCS); 1995; vol. 13, No. 1; pp. 57-88.

Dean M. Tullsen and Susan J. Eggers; Limitations of Cache Prefetching on Bus-Based Multiprocessor; 20th Annual International Symposium on Computer Architecture; 1993; pp. 278-288.

Steven Cameron Woo, Moriyoshi Ohara, Evan Torrie, Jaswinder Pal Singh, and Anoop Gupta; The SPLASH-2 Programs: Characterization and Methodological Considerations; 22nd Annual International Symposium on Computer Architecture; 1995; pp. 24-36.

Alexander V. Veidenbaum, Weiyu Tang, and Rajesh Gupta; "Adapting Cache Line Size to Application Behavior"; In Proceedings of the 13th International Conference on Supercomputing; 1999; pp. 145-154.

http://ecperf.theserverside.com/ecperf/; The publication date of this internet web page predates the filing date of the current application.

http://www.spec.org/jAppServer2001/press_release.html; The publication date of this internet web page predates the filing date of the current application.

http://www.spec.org/jbb2000/; The publication date of this internet web page predates the filing date of the current application.

Tien-Fu Chen and Jean-Loup Baer; An Effective On-Chip Preloading Scheme to Reduce Data Access Penalty; In Proceedings of Supercomputing, 1991; pp. 176-186.

Edward H. Gornish; Adaptive and Integrated Data Cache Prefecting For Shared-Memory Multiprocessors; PhD thesis, University of Illinois at Urbana-Champaign; 1995; pp. 1-150.

Erik Hagersten; Toward Scalable Cache-Only Memory Architectures; PhD thesis, Royal Institute of Technology, Stockholm; 1992; pp. 1-262.

Ashok Singhal et al.; A High Performance Bus for Large SMPs; In Proceedings of IEEE Hot Interconnects; 1996.

M.K. Tcheun, H. Yoon, and S.R. Maeng; An Adaptive Sequential Prefetching Sequential Prefetching Scheme in Shared-Memory Multiprocessors; Department of Computer Science and Technology (KAIST); 1997; pp. 306-313.

* cited by examiner

Bus generated transitions

CPU generated transitions

COMPUTER SYSTEM EMPLOYING BUNDLED PREFETCHING AND NULL-DATA PACKET TRANSMISSION

This application claims the benefit of provisional application Ser. No. 60/443,046 filed Jan. 28, 2003.

BACKGROUND OF THE INVENTION

1. Field of the Invention

This invention relates to the field of multiprocessor computer systems and, more particularly, to mechanisms and methods for prefetching data in multiprocessor computer systems.

2. Description of the Related Art

Cache-based computer architectures are typically associated with various features to support efficient utilization of the cache memory. A cache memory is a high-speed memory unit interposed in a memory hierarchy between a slower system memory and the microprocessor to improve effective memory transfer rates and, accordingly, improve system performance. The name refers to the fact that the small memory unit is essentially hidden and appears transparent to the user, who is aware only of a larger system memory.

An important consideration in the design of a cache memory subsystem is the choice of key design parameters, such as cache line size, degree of subblocking, cache associativity, prefetch strategy, etc. The problem in finding an "optimum setting" for these design parameters is that while improving one property, some others may be degraded. For example, an excessively small cache line may result in a relatively high number of capacity misses and in relatively high address traffic. A slightly longer cache line often decreases the cache miss rate and address traffic, while the data bandwidth increases. Enlarging the cache lines even more can result in increased data traffic as well as increased address traffic, since misses caused by false sharing may start to dominate. A further complication is that application behavior can differ greatly. A setting which works well for one application may work poorly for another.

Much research effort has been devoted to reducing the number of cache misses using various latency-hiding and latency-avoiding techniques, such as prefetching. Numerous prefetching schemes have been proposed, both software-based and hardware-based.

Software prefetching relies on inserting prefetch instructions in the code. This results in an instruction overhead, as well as resulting address traffic and snoop lookups.

Hardware prefetching techniques require hardware modifications to the cache controller to speculatively bring additional data into the cache. They often rely on detecting regularly accessed strides. A common approach to avoid unnecessary prefetches in multiprocessors is to adapt the amount of prefetching at run time. These proposals introduce small caches that detect the efficiency of prefetches based on the data structure accessed. Systems have been proposed to predict the instruction stream with a look-ahead program counter. A cache-like reference predictor table may be used to keep previous predictions of instructions. Correct branch prediction is needed for successful prefetching.

Another hardware prefetch approach is to exploit spatial locality by fetching data close to the originally used cache line. A larger cache line size can achieve this. Unfortunately, enlarging the cache line size is not as efficient in multiprocessor systems as in uniprocessor systems since it can lead to a large amount of false sharing and an increase in data traffic. The influence of cache line size on cache miss rate and data traffic has been the focus of various research. To avoid false sharing and at the same time take advantage of spatial locality, sequential prefetching fetches a number of cache lines having consecutive addresses on a read cache miss. The number of additional cache lines to fetch on each miss is called the prefetch degree.

A fixed sequential prefetch scheme issues prefetches to the K consecutive cache lines on each cache read miss. If the consecutive cache lines are not already present in a readable state in the cache, a prefetch message for each missing cache line is generated on the interconnect. The prefetch degree K is fixed to a positive integer in this scheme.

An adaptive sequential prefetch scheme is similar to the fixed sequential prefetch scheme, except that the prefetch degree K can be varied during run time. The prefetch degree is varied based on the success of previous prefetches. For example, one approach derives an optimal value of K by counting the number of useful prefetches. The protocol uses two counters that keep track of the total number of prefetches and the number of useful accesses to prefetched cache lines. Prefetched cache lines are tagged for later detection. Every sixteenth prefetch the useful prefetch counter is checked. If the number of useful prefetches is larger than twelve, K, is incremented. K is decremented if the number of useful prefetches is lower than eight or divided by two if less than three prefetches are useful. The scheme also has a method of turning prefetching on, since no detection can be carried out if the prefetch degree is lowered such that no prefetches are performed.

While most existing prefetch techniques efficiently reduce the amount of cache misses, they also increase the address traffic and snoop lookups, which are scarce resources in a shared-memory multiprocessor. This is especially true for systems based on snooping coherence, where each device has to perform a cache lookup for every global address transaction. The address networks of systems based on directory coherence are more scalable, since the address transactions are sent point-to-point. Still, systems based on snooping are often preferred because of their superior cache-to-cache transfer time. There is typically no difference in scalability of the data network between systems based on snooping coherence and systems based on directory coherence, since data packets can be sent point-to-point in both cases. Indeed, many commercial snoop-based systems have been built where the data network handles 50 percent more traffic than the available snoop bandwidth supports.

Thus, although various prefetch strategies have been successful in reducing the miss penalty in multiprocessing systems, it would be desirable to implement prefetching in a manner that reduces the cache miss rate without causing appreciable increases in address traffic and snoop lookups.

SUMMARY OF THE INVENTION

Various embodiments of a computer system employing bundled prefetching are disclosed. In one embodiment, a cache memory subsystem implements a method for prefetching data. The method comprises the cache memory subsystem receiving a read request to access a line of data and determining that a cache miss with respect to the line occurred. The method further comprises transmitting a bundled transaction on a system interconnect in response to the cache miss, wherein the bundled transaction combines a request for the line of data and a prefetch request. In response to the bundled transaction, the method further comprises determining that a second cache is an owner of the first line of data, determining whether the second cache is also an owner for any of the selected lines of data beyond the first line, the second cache transmitting to the first cache any of the selected lines for which the second cache is an owner, and the second cache transmitting a null-data packet to the first cache for each of a remainder of the selected lines of data for which the second cache is not an owner.

Figure 1:
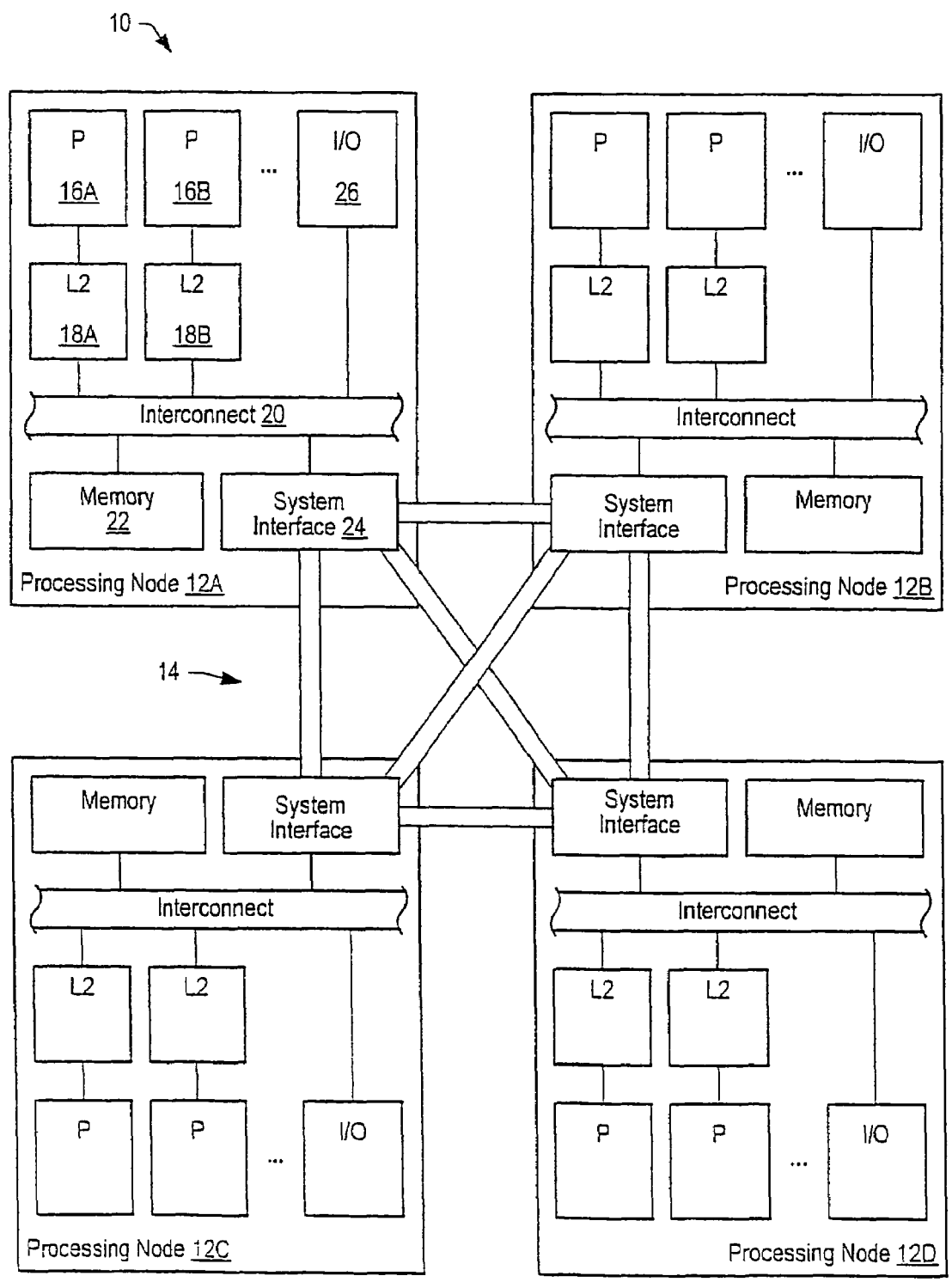
FIG. 1 is a block diagram of a multiprocessing computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of one embodiment of a multiprocessing computer system 10 is shown. Computer system 10 includes multiple processing nodes 12A–12D interconnected by a point-to-point network 14. Elements referred to herein with a particular reference number followed by a letter will be collectively referred to by the reference number alone. For example, processing nodes 12A–12D will be collectively referred to as processing nodes 12. In the embodiment shown, each processing node 12 includes multiple processors, caches, a memory, and a system interface. For example, processing node 12A is configured with multiple processors including processors 16A–16B. The processors 16 are connected to caches 18, which are further coupled to a node interconnect 20. Additionally, a memory 22 and a system interface 24 are coupled to node interconnect 20. Still further, one or more input/output (I/O) interfaces 26 may be coupled to node interconnect 20. I/O interfaces 26 are used to interface to peripheral devices such as serial and parallel ports, disk drives, modems, printers, etc. Other processing nodes 12B–12D may be configured similarly.

Each processing node 12 is a processing node having memory 22 as the shared memory. Processors 16 are high performance processors. In one embodiment, each processor 16 may employ an ultraSPARC™ processor architecture. It is noted, however, that any processor architecture may be employed by processors 16.

Typically, processors 16 may include internal instruction and data caches. Therefore, caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. Caches 18 provide rapid access to memory addresses frequently accessed by the processor 16 coupled thereto. Caches 18 may be configured in any of a variety of specific cache arrangements. For example, set-associative or direct-mapped configurations may be employed. In some embodiments, the processors 16 and caches 18 of a node may be incorporated together on a single integrated circuit in a chip multiprocessor (CMP) configuration. In other embodiments, a given processing node may include a single processor rather than multiple processors.

Node interconnect 20 accommodates communication between processors 16 (e.g., through caches 18), memory 22, system interface 24, and I/O interface 26. In one embodiment, node interconnect 20 includes an address bus and related control signals, as well as a data bus and related control signals. Because the address and data buses are separate, a split-transaction bus protocol may be employed upon node interconnect 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, node interconnect 20 may be implemented as a circuit-switched network or a packet-switched network. In embodiments where node interconnect 20 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 22 is configured to store data and instruction code for use by processors 16. Memory 22 preferably comprises dynamic random access memory (DRAM), although any type of memory may be used. Memory 22, in conjunction with similar illustrated memories in the other processing nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between processing nodes 12 as well as among processors 16 and caches 18 within a particular processing node 12A–12D. In one embodiment, the system interface 24 of each node may include a coherence controller to provide internode coherency.

In various embodiments, portions of memory 22 may be allocated to cache data that is mapped to other nodes (i.e., data having remote home nodes). In this manner, data accessed by a processor 16 may be cached in an allocated location of the memory 22 of that node to allow quicker subsequent accesses to the data.

In addition to maintaining internode coherency, system interface 24 may receive transactions through node interconnect 20 which require a data transfer to or from another processing node 12. System interface 24 performs the transfer, and provides the corresponding data for the transaction upon node interconnect 20, if appropriate. In the embodiment shown, system interface 24 is coupled to a point-to-point network 14. However, it is noted that in alternative embodiments other interconnect structures may be used.

Figure 2:
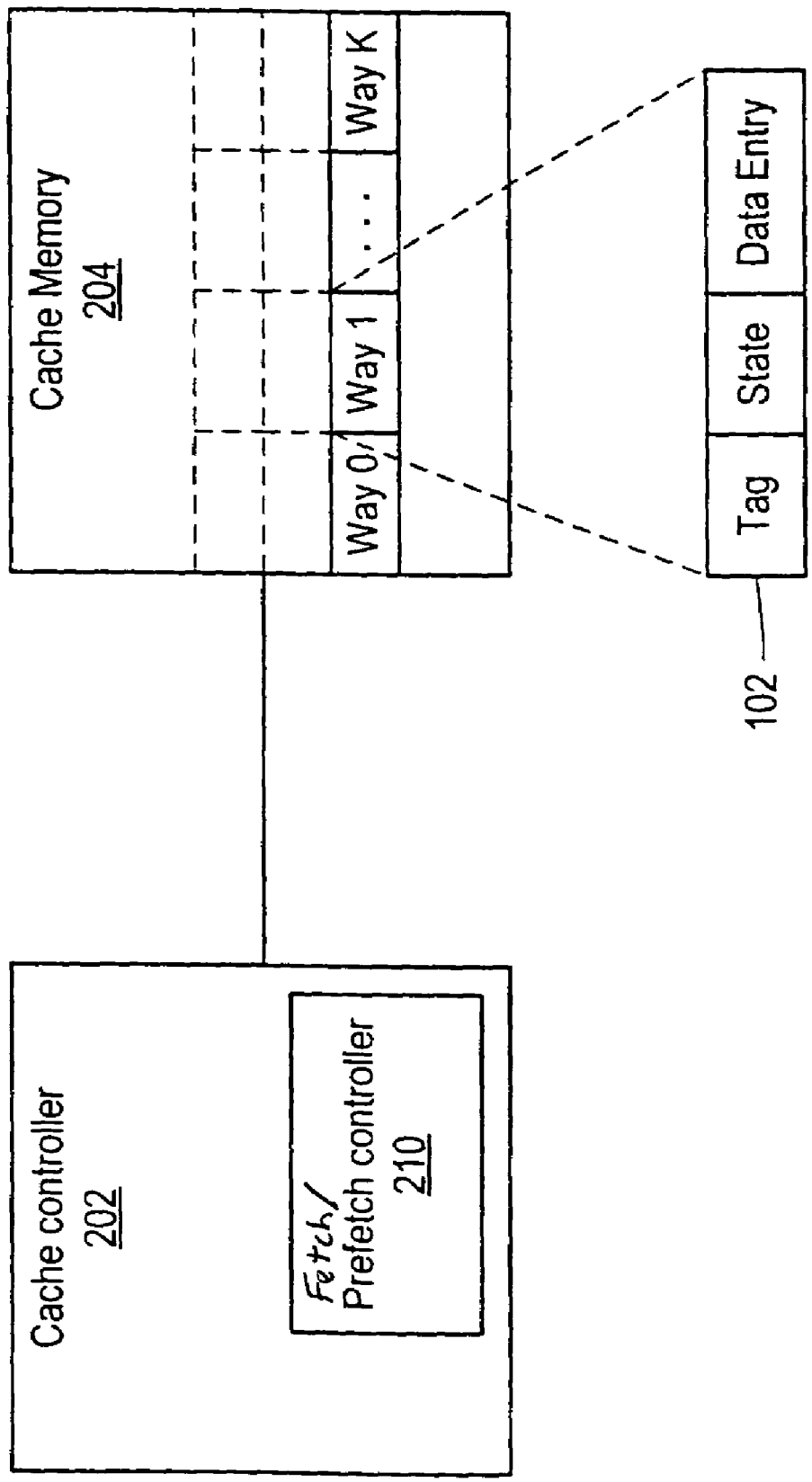
FIG. 2 is a block diagram illustrating one embodiment of a cache memory subsystem.

FIG. 2 is a block diagram of a cache subsystem illustrative of each of the caches 18 of FIG. 1. As illustrated, the cache subsystem includes a cache controller 202 coupled to a cache memory 204. Cache controller 202 includes a fetch/prefetch controller 210 configured to perform prefetching operations. As will be described in further detail below, in various embodiments, fetch/prefetch controller 210 may be configured to bundle a request generated due to a cache miss together with one or more associated prefetch requests to form a single request transaction conveyed on interconnect 20. In this manner, the amount of address traffic on interconnect 20 (and network 40) may be reduced.

In the depicted embodiment, cache memory 204 is implemented as a K-way set associative cache structure. A line of storage 102 within cache memory 204 is shown with a data entry, a tag field, and a state field. The state field identifies the state of the cache line, such as Modified, Owned, Shared, or Invalid in the MOSI protocol. In a conventional manner, a given set of lines of the cache memory 204 is accessed using an index portion of the address of a desired line. An occurrence of a cache hit is determined by cache controller 202 by comparing a tag field of the address with tag information stored in the tag field of the cache line, and by determining whether the state of the cache line is sufficient to satisfy the particular request (i.e., whether a sufficient access right to the line exists). It is noted that in other embodiments, cache memory 204 may be implemented using other specific cache arrangements, as desired.

Figure 3:
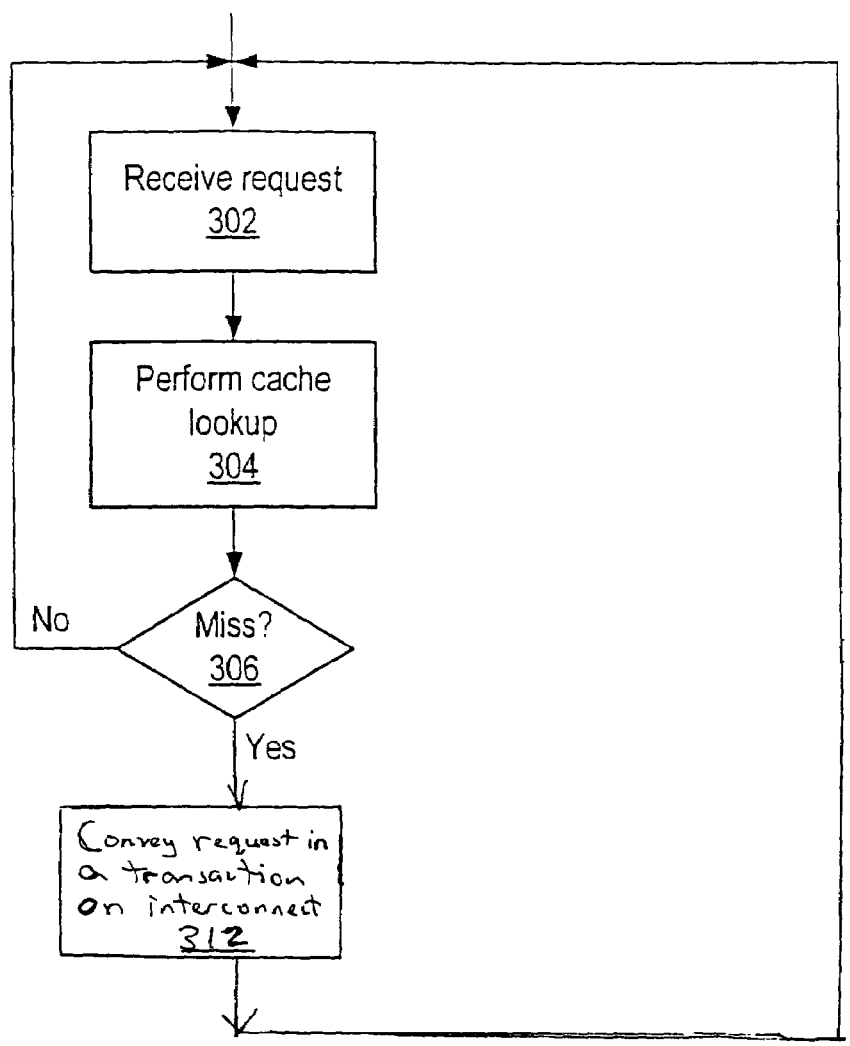
FIG. 3 is a flow diagram illustrating aspects of operation of one embodiment of a fetch/prefetch controller.

FIG. 3 is a flow diagram illustrating aspects of operation of one embodiment of fetch/prefetch controller 210. In step 302, cache controller 202 receives a request for a particular cache line. The request may correspond to a read operation or a write operation initiated by the corresponding processor 16. In response to receiving the request, cache controller 202 performs a lookup within cache memory 204 in step 304 to determine whether a cache line corresponding to the address of the request resides in the cache memory, and to determine whether the access right to the line as indicated by the state field is sufficient to satisfy the request. A cache hit occurs when a line exists within cache memory 204 that can be used to satisfy the request. If a hit occurs (step 306), cache controller 202 may perform subsequent operations (not shown) to satisfy the request, such as providing the data to the requesting processor in the case of a read operation or writing a new data entry to the cache line in the case of a write operation.

A miss may occur in cache memory 204 for various reasons. For example, a request to cache controller 202 that corresponds to a write operation initiated by the associated processor 16 may require that a line be in a valid, writable state, such as the modified state of the MOSI protocol. If a writable copy of the cache line does not exist in cache memory 204, the cache controller 202 may initiate a Read-Exclusive request on interconnect 20 in step 312 to obtain a writable copy of the cache line. Alternatively, if the cache line exists in the cache memory 204 but is not in a readable state (e.g., a copy exists in the shared state of the MOSI protocol), cache controller 202 may transmit an upgrade request on interconnect 20 in step 312 to allow the line to be upgraded to a writable state. Similarly, if a request to cache controller 202 is received that corresponds to a read operation initiated by the associated processor 16, but a copy of the cache line does not already exist in the cache memory 204 or the cache line exists but is in an invalid state, cache controller 202 may transmit a Read request on interconnect 20 in step 312 to obtain a readable copy of the cache line. It is noted that the requests initiated on interconnect 20 may be responded to by a memory 22 or by another cache 18 that owns the cache line.

As stated previously, fetch/prefetch controller 210 may be configured to perform prefetch operations in response to certain requests received by cache controller 202. In at least some instances, fetch/prefetch controller 210 may bundle an original request generated in step 312 with one or more prefetch requests to form a single transaction request that is conveyed on interconnect 20. In this manner, the amount of address traffic on interconnect 20 (and network 14) may be reduced.

Figure 4:
FIG. 4 illustrates an exemplary format of a bundled transaction request.

In one implementation as illustrated in FIG. 4, a bundled transaction request conveyed on interconnect 20 by fetch/prefetch controller 210 may include a simple bit-map indicating which lines beyond the original request to prefetch into the cache memory 204 (or indicating the lines beyond the original request that are being upgraded). In the illustration, the request includes a request type field identifying the request type such as, for example, a Read request, a ReadExclusive request, or an Upgrade request, and an address field indicating the address of the original request. A prefetch bitmap field is used to indicated the lines beyond the original request to prefetch.

Thus, in one embodiment when a request corresponding to a read operation is received by cache controller 202 and a miss occurs, fetch/prefetch controller 210 generates a bundled transaction that is conveyed on bus interconnect 20 that specifies a Read request corresponding to the cache line and that additionally specifies a prefetch Read request(s) to one or more sequential cache lines. Similarly, when a request corresponding to a write operation is received and a valid copy of the cache line does not exist in the cache memory, fetch/prefetch controller 210 may generate a bundled transaction that is conveyed on interconnect 20 that specifies a ReadExclusive request corresponding to the cache line and that specifies one or more prefetch ReadExclusive requests to the next sequential cache line(s). Likewise, when a request is received that requires a write access right to a cache line that exists in the cache memory in a read only state (e.g., the Shared state), fetch/prefetch controller 210 may generate a bundled transaction that is conveyed on interconnect 20 that specifies an Upgrade request to the corresponding cache line and that also specifies one or more Upgrade requests to the next sequential cache line(s). It is noted that in some implementations the fetch/prefetch controller 210 may specify the additional prefetched Upgrade requests only if the corresponding cache line(s) also exist in the cache memory in a readable state.

In various embodiments, prefetching techniques other than sequential prefetching may be employed to determine the specific cache lines for which prefetch operations are performed. For example, in one embodiment fetch/prefetch controller 210 may be configured to implement a stride-based prefetching technique, wherein the prefetch operations performed in step 312 are based on a stride pattern rather than a sequential pattern. Likewise, embodiments are further possible wherein the prefetch operations are determined based on more complex instruction stream prediction mechanisms, including those that implement predictor tables.

It is further noted that in other embodiments, a bundled transaction request may be encoded differently from the implementation illustrated in FIG. 4. For example, in various embodiments, certain bits may be provided in the transaction encoding to specify a stride associated with the prefetch requests. Likewise, bits may be provided within the transaction encoding to specify prefetch types that may differ from the request type of the original request (e.g., the request type of an original request may specify an Upgrade request, while the request type associated with a bundled prefetch request may specify a ReadExclusive operation.)

While bundling the original Read, ReadExclusive and Upgrade requests together with the prefetch requests may reduce the number of address transactions conveyed on interconnect 20, the technique may not reduce the number of snoop lookups each cache 18 is required to perform. In addition, in some instances, the technique may create a multi-source situation, where a single address transaction would result in data packets being transferred from many different sources. In various systems, such a situation may violate some basic assumptions for cache coherence.

Figure 5:
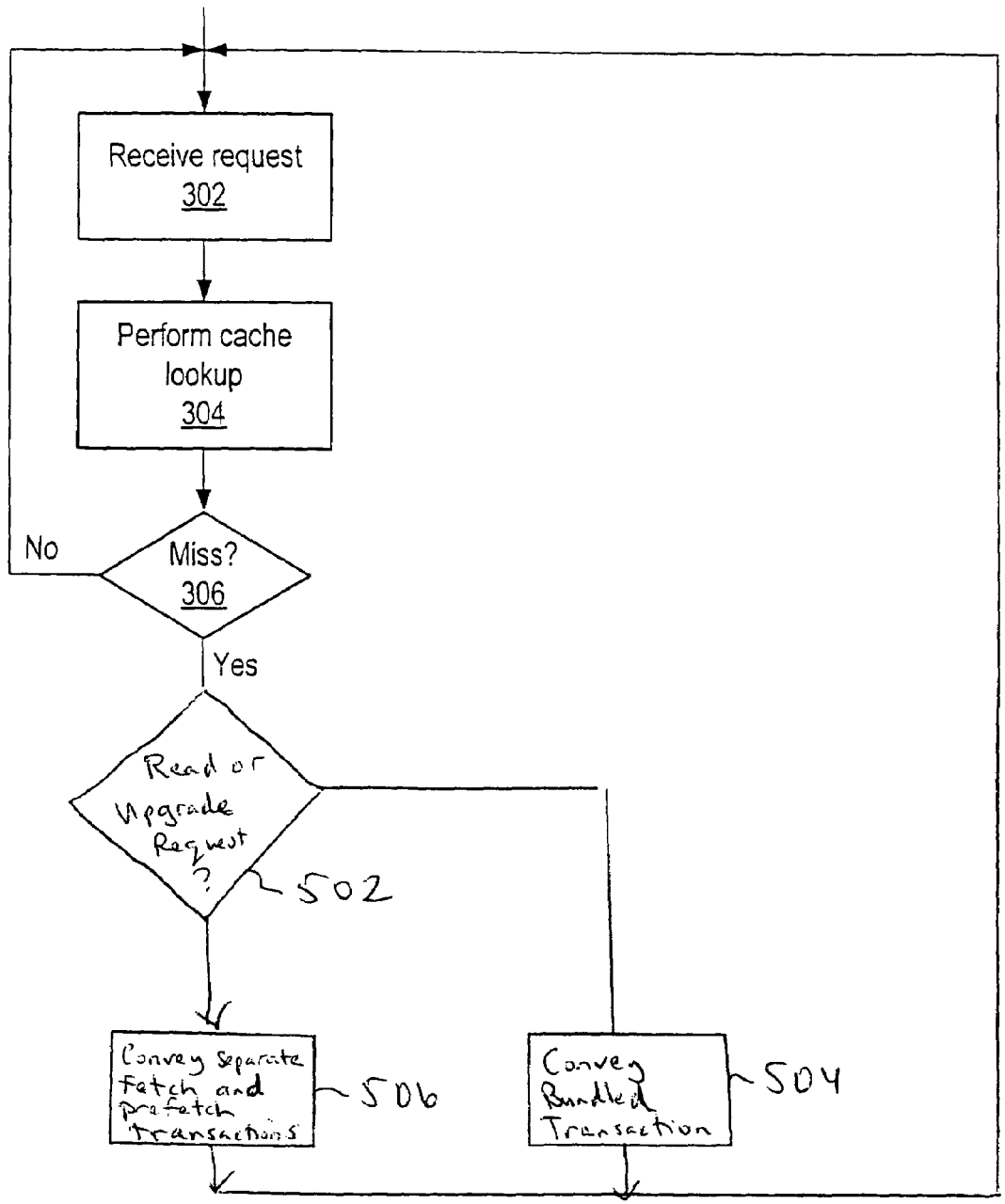
FIG. 5 is a flow diagram illustrating aspects of operation of another embodiment of a fetch/prefetch controller.

Accordingly, in a further embodiment as illustrated in FIG. 5, a more restrictive approach to the bundling technique may be employed by fetch/prefetch controller 210. Operations corresponding to those of FIG. 3 are numbered identically. In the embodiment of FIG. 5, Read requests and Upgrade requests may be bundled with prefetch operations; however, ReadExclusive requests are not bundled with prefetch operations in a single transaction. It is noted that since ReadExclusive transactions may cause changes to any of the snooping caches, they would still require a snoop lookup in each cache for each bundled cache line.

Thus, as illustrated in FIG. 5, if a request resulting in a cache miss necessitates issuance of a Read request (step 502), fetch/prefetch controller 210 may bundle the original request with one or more prefetch requests into a single request transaction conveyed on interconnect 20 in step 504. A single bundled read transaction may include the address A of the cache miss and information about the address offsets to the K prefetches. For example, in one implementation, the transaction encoding illustrated in FIG. 4 may be employed. Thus, the address offsets relative to the original address may be encoded in a prefetch bit mask. In one embodiment, all caching devices and memory devices on interconnect 20 may need to perform a snoop lookup for address A but only the device owning cache line A, performs snoop lookups for the prefetched cache lines. This device will reply with data for each prefetched address for which it is the owner. Otherwise, an empty NACK data packet may be supplied for the prefetched cache line. Since the states of the other caches are not affected by the prefetch transaction, they do not need to snoop the prefetch addresses.

In some implementations, a memory controller associated with memory 22 may further be configured to respond to prefetch requests specified in bundled prefetch transactions. In such embodiment, an owner bit may be associated with each line stored in memory 22. The owner bit is cleared by the memory controller on a ReadExclusive or an Invalidate request and is set on a Writeback request.

Figure 6:
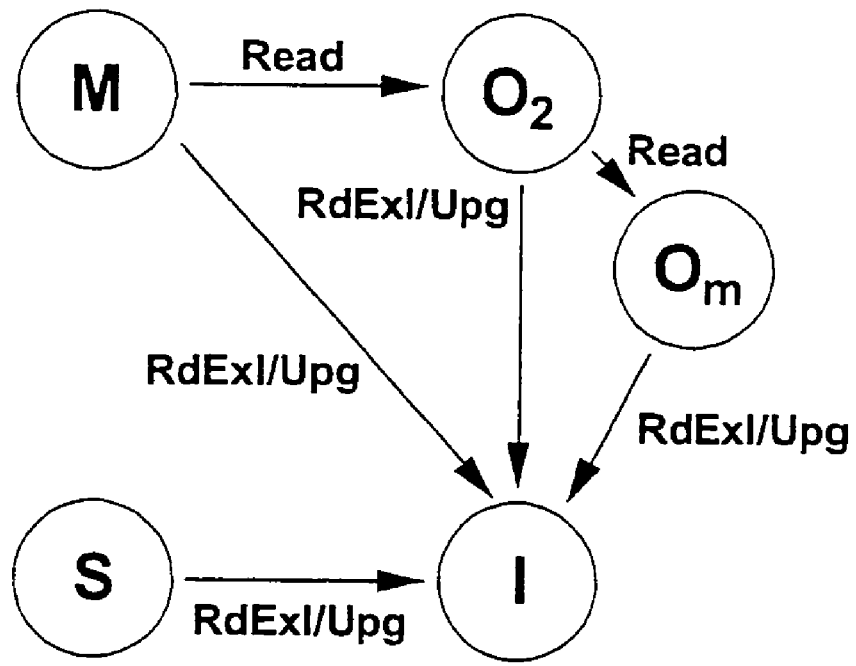
FIG. 6 is a state transition diagram illustrating aspects of operation of another embodiment of a fetch/prefetch controller.
Figure 6:
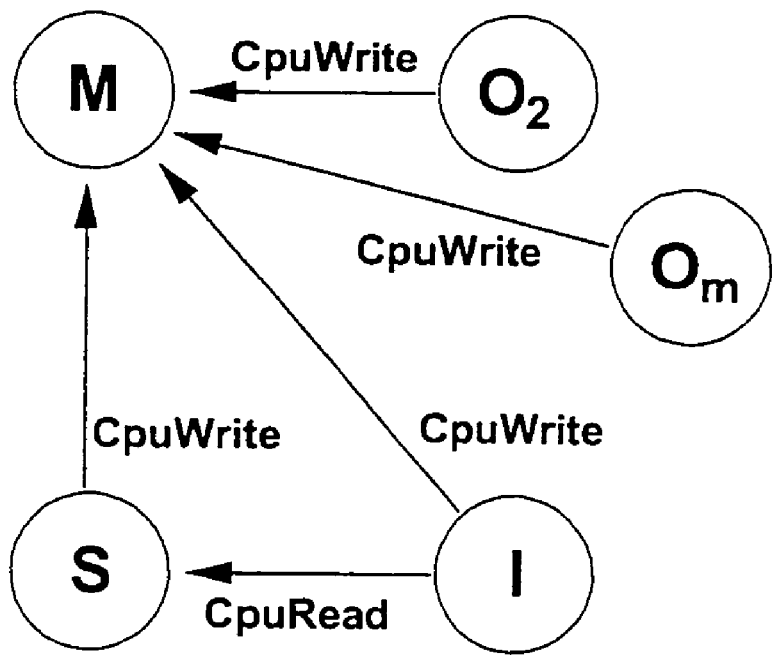

Upgrade requests (i.e., resulting from writes to cache lines in state shared) may also be bundled in a single transaction to limit the number of snoop lookups. To support upgrade request bundling, an additional type of the owner state is introduced in the cache coherence protocol, and a similar extension is made to the memory states. More particularly, two types of the Owner state, $Owner_2$ (Owner 2) and $Owner_m$ (Owner many) are used to keep track of how many shared copies are available in the system. The first time a cache line becomes downgraded from the Modified state, the cache line will enter the $Owner_2$ state. In the $Owner_2$ state, there is at most one other cache sharing the data. If additional read requests are issued to the same address by another processor, cache lines in the $Owner_2$ state will change their state to the $Owner_m$ state. Cache lines in this state can be shared by an unknown number of caches. FIG. 6 shows transition state diagrams for interconnect and CPU generated transitions in such an embodiment.

Thus, if a cache miss in step 306 necessitates issuance of an upgrade request in step 502, the invalidate requests (i.e., corresponding to the upgrade requests) for each of the K consecutive cache lines being in the Shared state in the requesting device are bundled in step 504 with the Invalidate request of address A on the bus. Address A is snooped by all devices, possibly causing a cache invalidation. If a device has address A in the $Owner_2$ state, it will also invalidate each of the prefetch cache lines it currently has in the $Owner_2$ state. It is noted that cache lines in the $Owner_2$ state are shared by at most one other device, i.e., the requesting device, the copy in the requesting device will be the only copy left. The device owning address A will send a reply to the requesting node indicating which of the bundled upgrade cache lines it now safely can put into the Modified state. Cache lines being invalidated in the $Owner_m$ state cannot be handled in the same way since the number of sharers is not known. In this case, only the original address will be invalidated.

As illustrated in FIG. 5, in one embodiment, for requests other than Read or Upgrade requests, fetch/prefetch controller 210 does not convey bundled prefetch transaction requests. Instead, in step 506 fetch/prefetch controller 210 may generate a transaction on interconnect 20 corresponding to the address of the miss, and may additionally convey separate prefetch transactions on interconnect 20, as desired.

In one specific implementation employing a SunFire™ 6800 architecture, snooping cache coherence is implemented using logically duplicated cache state tags: the snoop state (OSI) and the access state (MSI). A similar scheme is also used in the Sun E6000™ servers. The action taken for each snooped transaction depends on the snoop state. A service request may be put in the service queue for the cache as the result of the snoop state lookup, e.g., an Invalidate request or a Copy-Back request. The snoop state is changed before the next address transaction lookup is started. Entries may be added to the queue also when a cache snoops its own transaction, e.g., a My-Read request or a My-ReadExclusive request. Eventually, each service request will access the cache and change its access state accordingly. The cache's own requests are not removed from the head of the queue until the corresponding data reply is received and can thus temporarily block the completion of later service requests.

The UltraSPARC III processor, used in Sunfire 6800, implements the two logically duplicated states as a combination of the snoop result from the lookup in the main cache state and in the much smaller transition state table, which contains the new state caused by the snooped transactions still in the request queue. The hit in the transitional state table has precedence over a hit in the main cache state.

As discussed above, in some embodiments, bundled read prefetches will only retrieve the data if the owner of the original transaction also is the owner of the prefetched data. All caches snoop the address of the original read transaction address in order to determine if they are the owner. Only the owner will add an entry in its service queue: a Read-Prefetch request. Thus, the snoop bandwidth will not increase for the other caches. When the transaction reaches the head of the request queue, it is expanded to behave like one Copy-Back request for each prefetch cache line. If the cache is not the owner of a prefetch line, it will reply with a null-data NACK packet to the requesting CPU, which will simply remove the My-Read request from its service queue. The requesting cache must assume a shared snoop state for each prefetched cache line when the original request is sent out. It is noted that this may create false invalidate requests if the null data is returned from the owner cache.

As was also stated previously, an owner state bit may be added to each cache line in main memory 22. SunFire 6800 systems already have some state (gI, gS and gO) associated with each cache line for other reasons. The extra bits used for these states are gained by calculating the ECC code over a larger data unit and are available at no additional cost. One such unused bit in memory may be employed for the owner state bit. In such an implementation, the bit should be cleared on the first ReadExclusive request to the cache line and set again on its Write-Back request.

Figure 7:
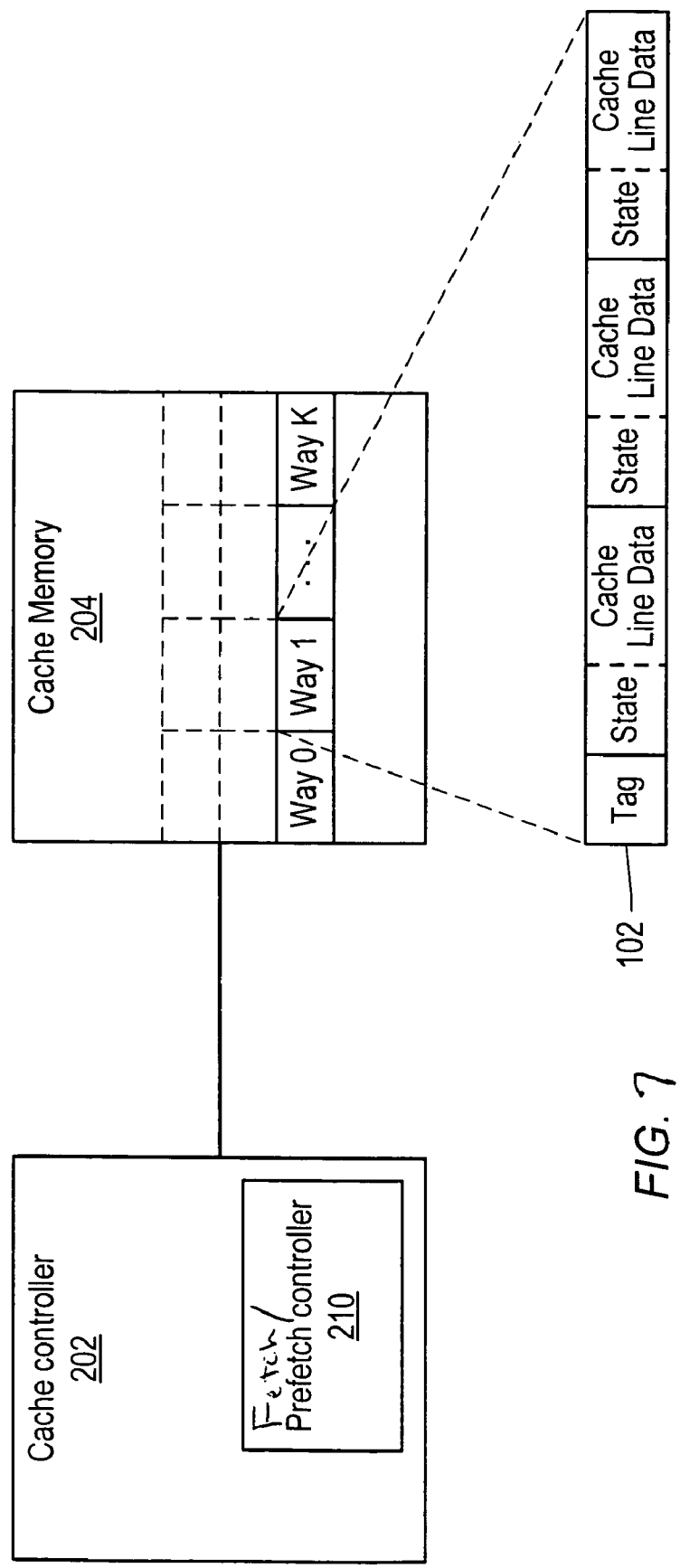
FIG. 7 is a block diagram of a cache memory subsystem employing a subblocked cache structure.

Referring next to FIG. 7, to reduce memory overhead in the cache implementation, a subblocked cache may be employed. As illustrated, in a subblocked cache, a single address tag is associated with several cache lines, while each cache line has its own state field. In the embodiment of FIG. 7, fetch/prefetch controller 210 may be configured to prefetch lines in step 312 (or step 504) that are aligned to the addresses having the same cache tag. Thus, on a miss, fetch/prefetch controller 210 may be configured to convey a bundled transaction on interconnect 20 requesting all available (or a subset) of lines within the same cache tag.

It is noted that in other embodiments, additional or alternative request types may be conveyed by fetch/prefetch controller 210 on interconnect 20, depending upon the implementation. In addition, single-node embodiments of a multiprocessing computer system are further possible that employ a fetch/prefetch controller 210 in accordance with the foregoing description.

It is additionally noted that the bundling prefetch transactions described above may further be implemented in conjunction with systems that employ capacity prefetching techniques, such as that described in co-pending commonly assigned patent application Ser. No. 10/408,691, entitled now U.S. Pat. No 7,165,146 "MULTIPROCESSING COMPUTER SYSTEM EMPLOYING CAPACITY PREFETCHING", Wallin, et al, the disclosure of which is incorporated herein by reference in its entirety.

Although the embodiments above have been described in considerable detail, numerous variations and modifications will become apparent to those skilled in the art once the above disclosure is filly appreciated. It is intended that the following claims be interpreted to embrace all such variations and modifications.

What is claimed is:

1. A method for prefetching data in a multiprocessing computer system comprising:
   a first cache receiving a request to access a first line of data, wherein the request to access the first line of data is a read request;
   determining that a cache miss with respect to the first line occurred; and
   transmitting a bundled transaction on a system interconnect in response to the cache miss, wherein the bundled transaction combines a request for the first line of data and a prefetch request, and wherein the bundled transaction includes a bit-map indicating selected lines of data beyond the first line to be prefetched in response to the prefetch request;
   wherein, in response to the bundled transaction, the method further comprises:
   determining that a second cache is an owner of the first line of data;
   determining whether the second cache is also an owner for any of the selected lines of data beyond the first line;
   the second cache transmitting to the first cache any of the selected lines for which the second cache is an owner; and
   the second cache transmitting a null-data packet to the first cache for each of a remainder of the selected lines of data for which the second cache is not an owner.

2. The method as recited in claim 1 wherein the prefetch request is a prefetch read request.

3. The method as recited in claim 2 wherein the prefetch read request is a request to a sequential cache line.

4. A multiprocessing computer system comprising:
   a microprocessor configured to convey a request to access a first line of data, wherein the request to access the first line of data is a read request;
   a first cache coupled to receive the request, wherein the first cache is configured to transmit a bundled transaction on a system interconnect in response to a cache miss, wherein the bundled transaction combines a request for the first line of data and a prefetch request, and wherein the bundled transaction includes a bit-map indicating selected lines of data beyond the first line to be prefetched in response to the prefetch request; and
   a second cache, wherein in response to the bundled transaction and a determination that the second cache is an owner of the first line of data, the second cache is configured to transmit to the first cache any of the selected lines for which it is an owner and is configured to transmit a null data packet to the first cache for each of a remainder of the selected lines for which it is not an owner.

5. The multiprocessing computer system as recited in claim 4 wherein the prefetch request is a prefetch read request.

6. The multiprocessing computer system as recited in claim 5 wherein the prefetch read request is a request to a sequential cache line.

* * * * *